United States Patent [19]
Smith et al.

[11] Patent Number: 5,757,260
[45] Date of Patent: May 26, 1998

[54] MEDIUM VOLTAGE SWITCHGEAR WITH MEANS FOR CHANGING FUSES

[75] Inventors: James E. Smith, Bethel Park; Francois Marchand, Upper St. Clair; Robert Yanniello, Cranberry Township, all of Pa.

[73] Assignee: Eaton Corporation, Cleveland, Ohio

[21] Appl. No.: 724,160

[22] Filed: Sep. 26, 1996

[51] Int. Cl.$^6$ .............................. H01H 85/20; H02B 5/00
[52] U.S. Cl. .............................. 337/186; 337/6; 337/168; 361/603; 361/608; 200/50.21; 200/50.27
[58] Field of Search .......................... 337/6, 7, 158, 337/168, 186, 211, 212; 361/601, 603, 605, 608, 616, 620, 630; 200/50.21, 50.27

[56] References Cited

U.S. PATENT DOCUMENTS

| | | | |
|---|---|---|---|
| 3,896,353 | 7/1975 | Burton et al. | 361/609 |
| 3,991,348 | 11/1976 | Evans | 361/621 |
| 4,233,643 | 11/1980 | Iverson et al. | 361/616 |
| 5,001,600 | 3/1991 | Benson | 361/610 |

OTHER PUBLICATIONS

OEM Switchgear Component Products, EATON Corporation, SA-12098, File No. 33-700, May 1996.
Westinghouse VacClad-W Medium Voltage Metal-Clad Switchgear, EATON Corporation, Application Data: 32-265, Mar. 1996.

*Primary Examiner*—Leo P. Picard
*Assistant Examiner*—Jayprakash N. Gandhi
*Attorney, Agent, or Firm*—Martin J. Moran

[57] ABSTRACT

Fuses for the potential transformers (PTs) in medium voltage switchgear are mounted in fuse assemblies which are reciprocated within the switchgear enclosure independently of the transformers they protect between a connected position in which the fuse assemblies engage stabs at the rear wall of the enclosure and a retracted position adjacent a door at the front of the enclosure through which the fuses are inserted and removed while the fuse assemblies remain within the enclosure. The fuse assemblies include insulative tubes having first releasable contacts at a distal end which engage the stabs and second releasable contacts which engage fixed contacts connected to the transformers and spaced from the rear wall. The insulative tubes are mounted on a carriage which reciprocates between the connected and retracted positions. An interlock prevents opening of the door except where the carriage is in the retracted position and blocks movement of the carriage with the door open. The carriage can be alternatively turned over so that it can serve a transformer mounted over or under the fuse assembly, or two units, one having a connection facing upward and the other having its connection facing downward, can be inserted between an upper and lower transformer.

18 Claims, 8 Drawing Sheets

MEDIUM VOLTAGE SWITCHGEAR WITH MEANS FOR CHANGING FUSES

BACKGROUND OF THE INVENTION

1. Field of the Invention

This invention relates to medium voltage switchgear and particularly to an arrangement for mounting and servicing fuses used to protect the current and potential transformers found in such equipment.

2. Background Information

Medium voltage switchgear includes circuit breakers and related equipment operating at voltages of from 5 to 38 KV. Such circuit breakers, being large and heavy, are mounted on trucks for insertion into and removal from metal enclosures or cabinets in which they are housed. As the circuit breaker rolls fully into position within the enclosure, contact fingers engage stabs which connect the circuit breaker to the line and load conductors. Withdrawal of the truck disconnects the circuit breaker from all conductors, thereby assuring a save condition for maintenance or removal.

Such medium voltage switchgear includes separate current transformers (CTs) used to measure the current and potential transformers (PTs) used to meter the voltage. These transformers, and especially the PTs, tend to be sizeable and heavy, and are therefore, also mounted on trucks. Again, spring contacts engage a pair of stabs to connect the two ends of the primary winding to the electrical system. A rotary switch operated by movement of the truck connects and disconnects the secondary winding to a user circuit, and is arranged relative to engagement of the stabs so that the primary winding is always connected first and disconnected last. A fuse is connected in series with the primary winding by lateral insertion into a pair of U-shaped spring clips. The fuse is mounted with the transformer in a drawer which must be fully withdrawn outside of the enclosure for access to the fuses from the top. This requires installing extension rails which must be stored between uses.

In some installations, two or three transformers, typically the smaller PTs, are mounted on a single truck with a fuse for each primary circuit branch. As the PTs can be very large, in other installations the fuses are mounted in a separate truck slidable in a cell which is remote from the cell containing the PT. However, even in this case the fuses are mounted by U-shaped spring clips in a drawer which must be fully withdrawn on extension rails for servicing of the fuses. In addition, various size trucks are required for the different sizes and combinations of transformers and for the separately housed fuses.

There is a need, therefore, in medium voltage switchgear for improved apparatus for mounting and servicing fuses.

There is a more particular need for improved medium voltage switchgear having a single flexible arrangement for mounting and servicing the fuses which can be used with various transformer arrangements including remote mounting of the fuses.

There is an additional need for such improved medium voltage switchgear which provides a more efficient and convenient arrangement of components and especially for components for mounting and servicing the fuses.

There is a further need for improved medium voltage switchgear which does not require the use of extension rails to service the fuses.

There is another need for improved medium voltage switchgear does not require moving the transformers to service the fuses.

SUMMARY OF THE INVENTION

These needs and others are satisfied by the invention which is directed to medium voltage switchgear in which the fuses are mounted for movement within the switchgear enclosure independently of the transformers they protect, and can be replaced without removing a truck from the enclosure and therefore without the extension rails formally needed. More particularly, the medium voltage switchgear of the invention includes a metal enclosure with a back wall, stabs accessible at the back wall, and fixed contacts spaced from the back wall. Fuse assemblies include a fuse, an insulative tube having a distal end and a proximal end through which the fuse is inserted into the insulative tube, first releasable contact means on the distal end of the insulative tubes for reasonably engaging the stabs to electrically connect a first contact end of the fuse to the stab and second releasable contact means for reasonably connecting a second end of the fuse to the fixed contact. The switchgear further includes carriage means carrying the fuse assembly and mounted in the enclosure for reciprocal movement between a connected position toward the back wall in which the first releasable contact means of the fuse assembly engages the stab and the second releasable contact means engages the fixed contact, and a retracted position away from the back wall in which the first and second releasable contact means are disengaged from the stab and fixed contact, respectively, for insertion and removal of the fuse in and from the insulative tube. The carriage has a front wall with an opening through which the proximal end of the tube is accessible with the carriage in the retracted position for inserting and removing the fuses. Means are provided for reciprocating the carriage between the retracted and connected positions so that the fuse assembly remains totally enclosed within the enclosure and the fuses are inserted and removed through the openings in the front wall. Preferably, interlock means are provided blocking the opening in the front wall except when the carriage is in the retracted position. This interlock can take the form of a door covering the opening when closed, means preventing opening of the door except when the carriage is retracted, and means blocking operation of the means for reciprocating the carriage when the door is open. Multiple fuse assemblies can be mounted on the carriage as necessary. The insulative tubes can be longer than the fuses in which case the fuse assemblies include an insulative extender rod which is secured to the second contact end of the fuse and extends to the proximal end of the insulative tube.

A single configuration of the carriage means is suitable for various configurations and sizes of the transformers. The fuse assemblies include insulative mounts offsetting the insulative tubes vertically from the carriage which is mountable with the insulative tube or tubes on top or alternatively on the bottom so that, for instance, where a switchgear includes a transformer fixedly mounted at the bottom of the enclosure and a second transformer fixedly mounted at the top of the enclosure, two of the carriages can be mounted in between with one having the fuse assembly extending downward to connect with the transformer at the bottom of the enclosure and the other having the fuse assembly extending upward to connect to the transformer at the top of the enclosure.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENT

Figure 1:
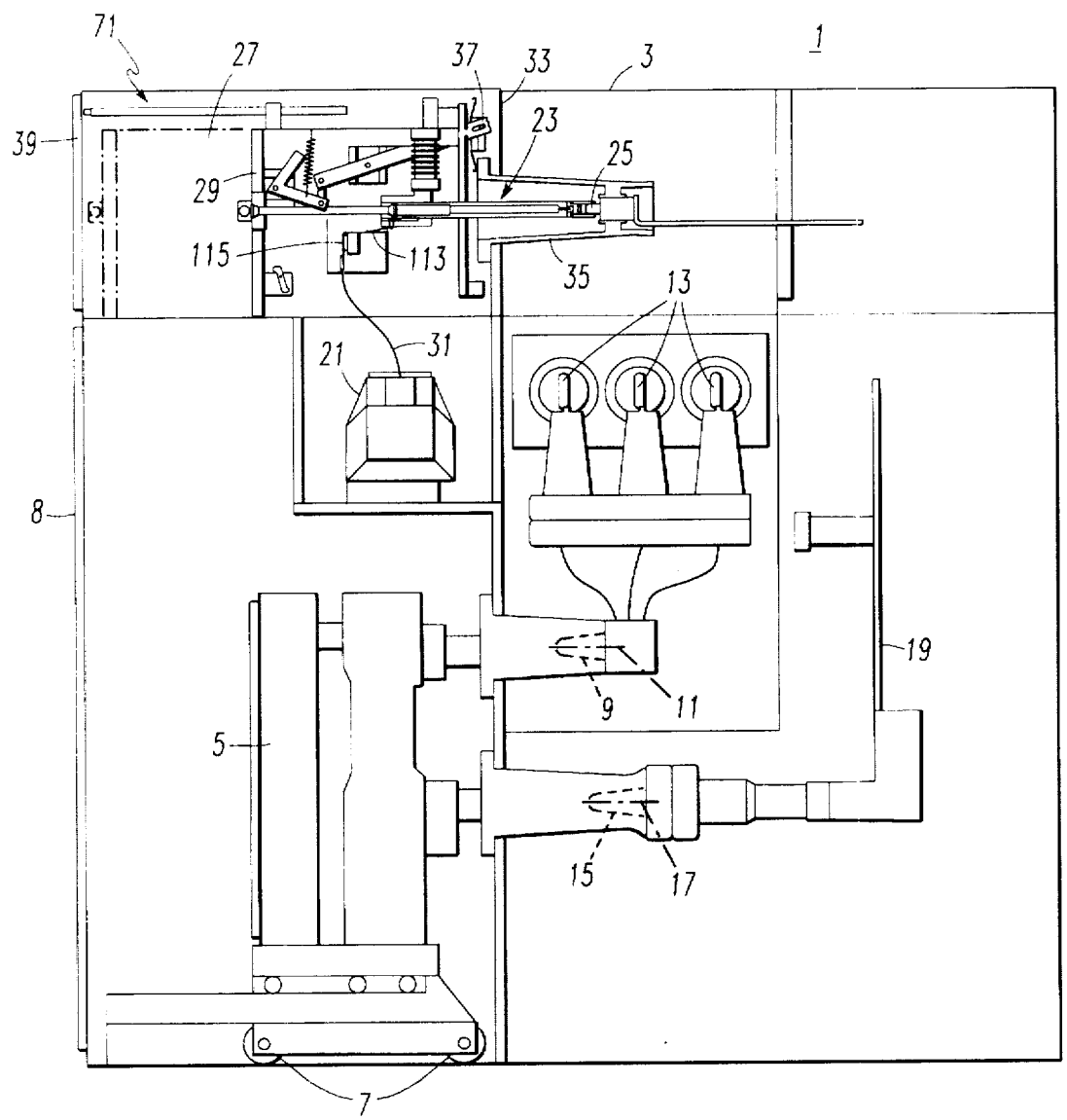
FIG. 1 is a longitudinal vertical sectional view through medium voltage switch gear incorporating the invention.
Figure 2:
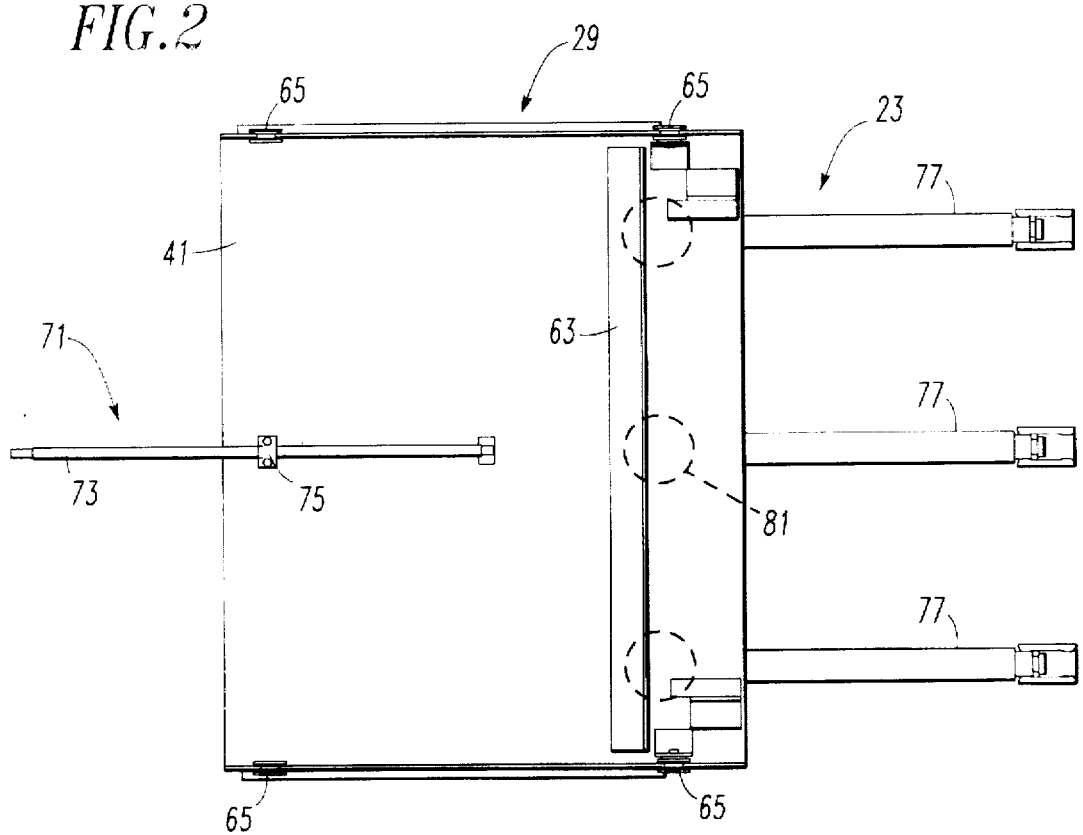
FIG. 2 is a plan view of a fuse assembly and carriage therefor which are incorporated into the switch gear of FIG. 1.
Figure 3:
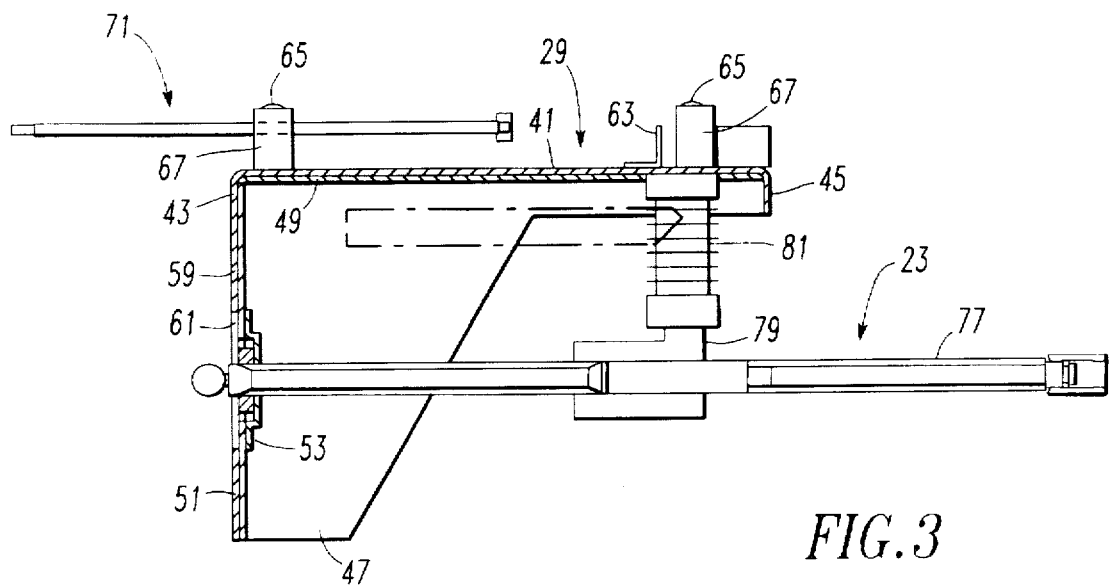
FIG. 3 is a longitudinal vertical section through the fuse assembly and carriage of FIG. 2.
Figure 4:
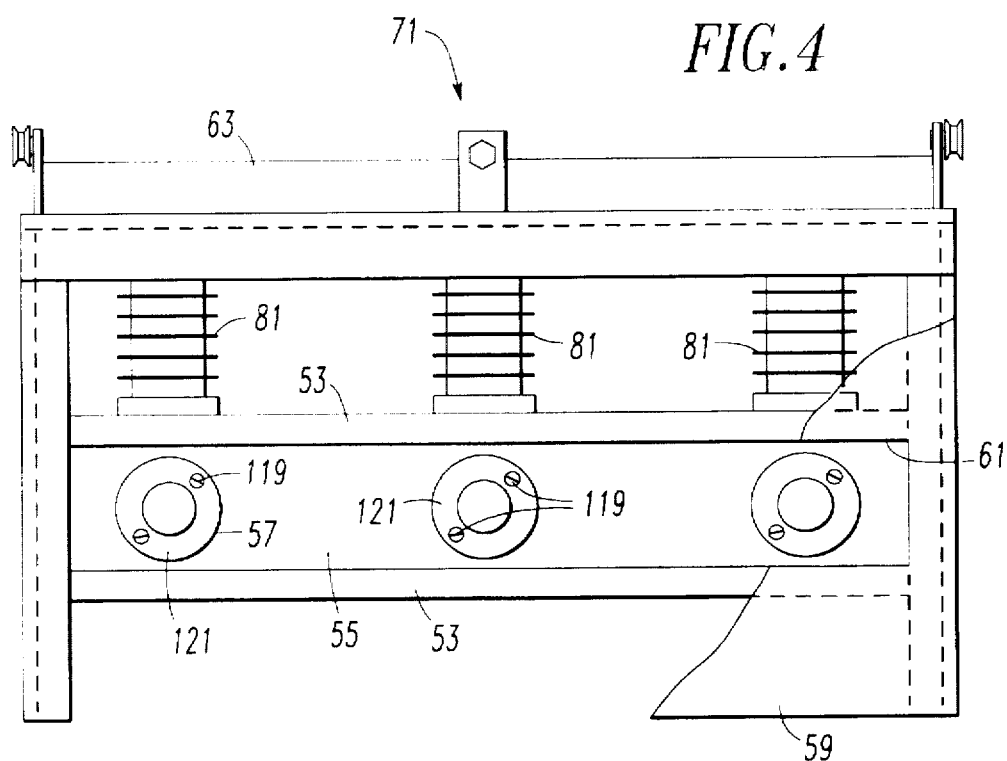
FIG. 4 is a front view of the fuse assembly and carriage of FIGS. 2 and 3.
Figure 5:
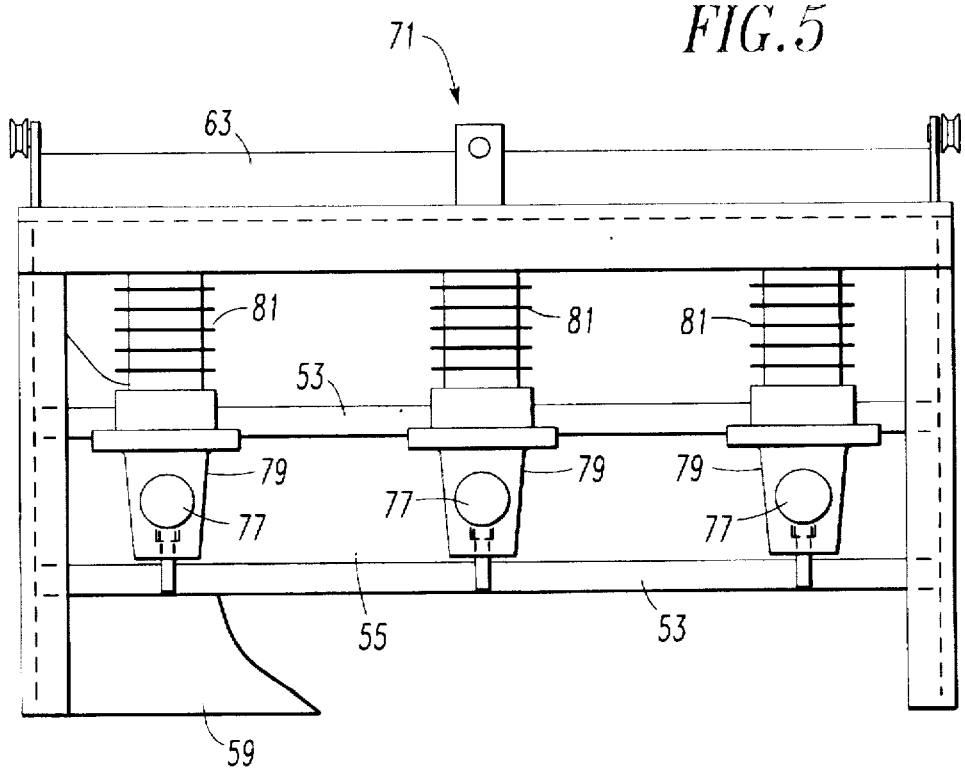
FIG. 5 is a rear view of the fuse assembly and carriage.

FIG. 1 illustrates medium voltage switch gear 1 incorporating the invention. The switch gear 1 includes a metal cabinet 3 housing a draw-out circuit breaker 5 mounted on wheels 7 and accessible through a door 8. The circuit breaker 5 has line contact fingers 9 which engage stabs 11 to connect the circuit breaker to the buses 13 of an electrical supply system. A second set of contact fingers 15 engage stabs 17 to connect the circuit breaker to load buses 19.

The cabinet 3 houses transformers such as the potential transformer 21 for monitoring the system voltage. A fuse assembly 23 connects the primary windings of the potential transformer (PT) 21 to the load busses 19 through stabs 25. As mentioned, it is conventional for the transformers and associated fuse assembly to be mounted together in a drawer or truck which when fully inserted in the cabinet engages the stabs to connect the transformer to the primary of the power system. This had a number of disadvantages previously described. In accordance with the invention, the transformer 21 is fixedly mounted within the cabinet 3. The fuse assembly 23 is movably mounted within an enclosure 27 the cabinet 3 on a carriage 29 and is connected to the primary of the (PT) 21 by cabling 31. Enclosure 27 includes a rear wall 33 through which the stabs 25 enclosed by insulated boots 35 are accessible. When the carriage 29 is moved to the fully inserted/connected position shown in full line in FIG. 1, the fuse assembly 23 engages stabs 25. When the carriage is withdrawn to the retracted/disconnected position shown in phantom line in FIG. 1, the fuse assembly is disconnected from the stabs 25. It should be noted that in the retracted position the carriage 29, and therefore the fuse assembly 23, remain within the enclosure 27 so that no extension rails are required to withdraw the fuse assembly fully from the cabinet as required in the prior art. As will be described more fully, a shutter mechanism 37 blocks access to the stabs 25 when the carriage 29 is withdrawn to the retracted position. A door 39 on the front of the cabinet 3 is opened to provide access to the fuse assembly 23 when the carriage 29 is in the retracted position.

The fuse assembly 23 and the carriage 29 on which it is mounted are shown in more detail in FIGS. 2–5. The carriage 29 includes a planner base member 41 which has integral flanges 43 and 45 along the front and rear edges, respectively. A pair of planar side members 47 have flanges 49 along top edges which are welded to the base member 41 and front edge flanges 51 secured at their upper ends to the front flange 43 on the base member. A pair of cross members 53 extend between the flanges 51 and support a plate 55 having openings 57 through which it will be seen that the fuses are accessible. A front wall plate 59 covers the entire front of the carriage 29, but has an opening 61 through which the plate 55 and openings 57 are accessible. An angle 63 provides stiffening to the rear portion of a planner base 41.

The carriage 29 has rollers 65 at four corners supported on brackets 67 which engage rails 69 (see FIG. 7) mounted on cabinet walls within the enclosure 27. The carriage 29 is propelled along the rails by a crank assembly 71 which includes a threaded shaft 73 which engages a ball screw 75. The forward end of the threaded shaft 73 is mounted to the cabinet in a manner to be discussed below.

The fuse assembly 23 includes for each primary winding of the transformer 21 an insulative tube 77 secured at a front end to the front plate 55 on the carriage, and approximate its center by an insulative molded mount 79. The mount 79 is supported by an insulator 81 connected to the rear portion of the planner base 41 of the carriage 29.

Figure 6:
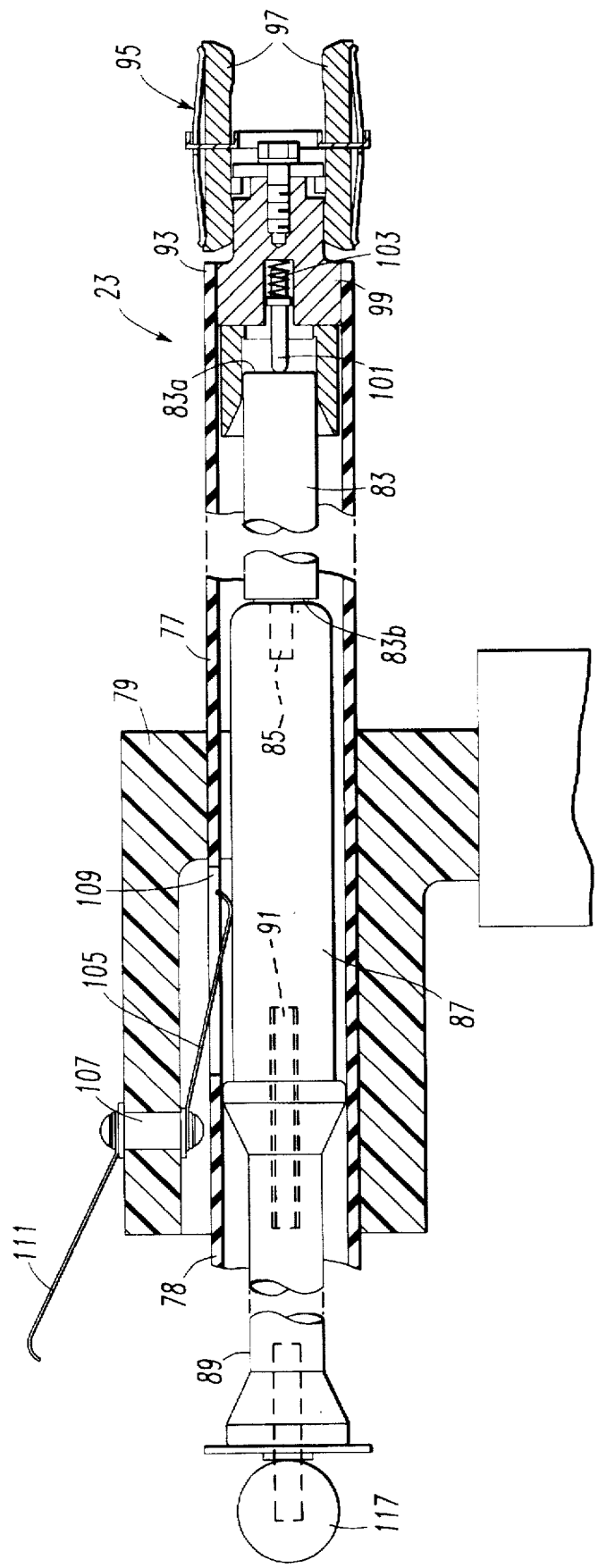
FIG. 6 is a longitudinal sectional view through the fuse assembly shown in FIGS. 2–5 with sections removed to accommodate the enlarged scale.

As more clearly shown in FIG. 6, the insulative tube 77 carries a special elongated fuse 83 having a threaded stud 85 in one end. The threaded stud 85 secures the fuse to an aluminum rod 87 which in turn is secured to an insulative rod 89 by a threaded stud 91. The fuse 83 is inserted into the proximal end 78 of the insulative tube 77 by the insulative rod 87 through the opening 57 in the front plate 55. The distal end 93 of the insulative tube 77 carries a finger cluster 95 for engaging the stabs 25 adjacent to the rear wall 33 of the enclosure 27. This finger cluster 95 includes spring biased fingers 97 which contact a brass boss 99. An electrically conductive pin 101 mounted in the boss 99 is biased toward a first end 83a of the fuse 83 by a helical compression spring 103 to electrically connect the fuse to the finger cluster 95 and therefore to the stab 25 when the fuse assembly is moved to the connected position as will be seen. A leaf contact 105 cantilevered by an electrically conductive fastener 107 from the molded support 79 protrudes through an opening 109 in the wall of an insulative tube 77 to contact the aluminum rod 87 to provide an electrical connection to the second end 83b of the fuse 83 connected to the rod 87. A second leaf contact 111 connected to the leaf contact 105 by the electrically conductive fastener 107 contacts a complimentary flexible contact 113 supported by an angle 115 extending transversely across the enclosure 27 (see FIGS. 1 and 7). This flexible contact 113 constitutes a fixed contact which is corrected by the cable 31 to the transformer 21.

The insulative rod 89 has a handle 117 for inserting the fuse 83 into the proximal end 78 of the insulative tube 77. As the fuse is fully inserted into the insulative tube 77, the pin 101 is biased against the fuse by the spring 103. The fuse is locked against the bias of the spring 103 by a pair of screws 119 which secure a locking plate 121 to the plate 55 on the front of the carriage (see FIG. 4). As mentioned, the carriage 29 is reciprocated between the inserted/connected position and retracted/disconnected position by the crank assembly 71. In the inserted/connected position the finger clusters 95 engage the stabs 25 and the fixed contacts 113 are engaged by the leaf contacts 111 to connect the primaries of the PTs 21 to the buses 19 through the fuses 83.

Figure 7:
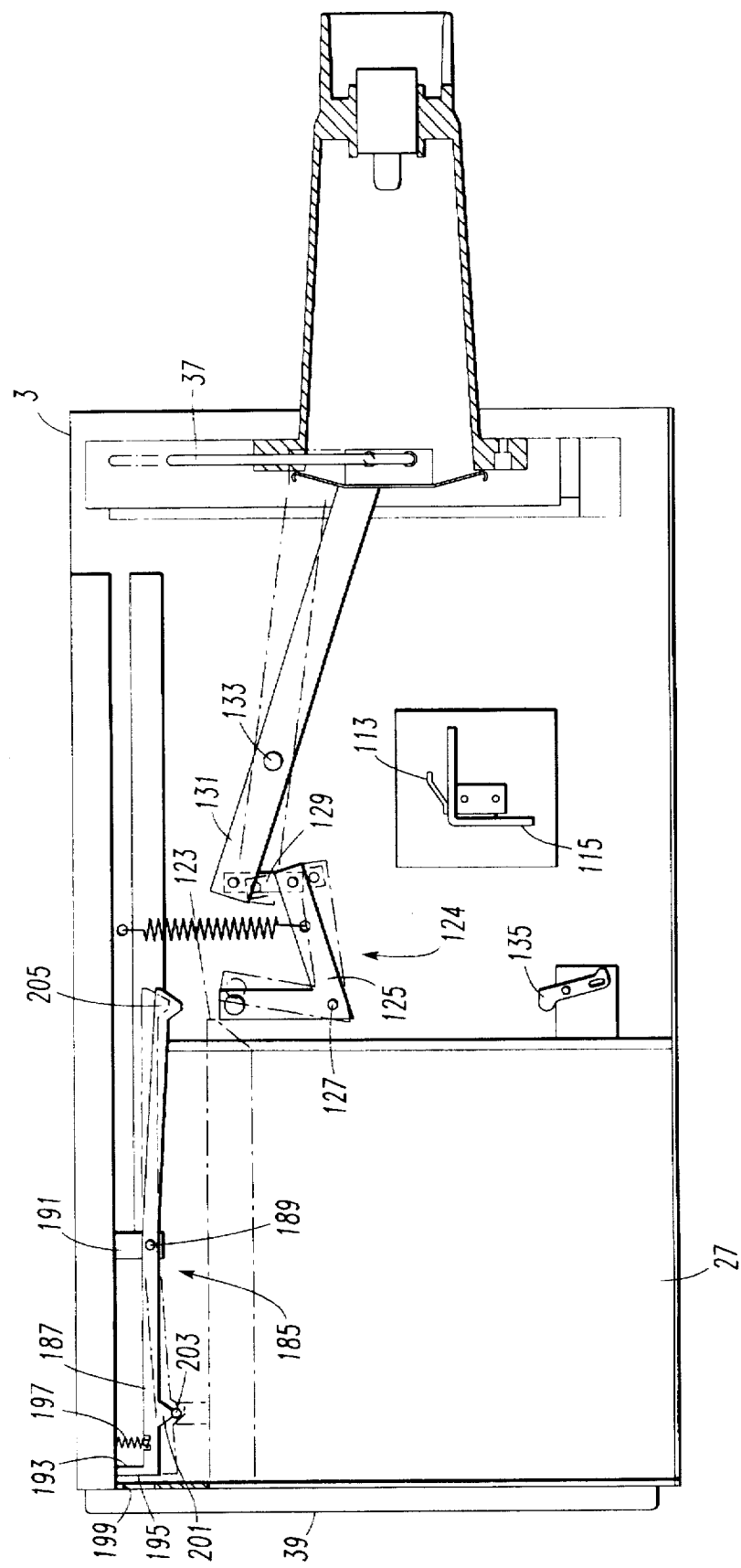
FIG. 7 is a vertical section through the section of the switch gear housing the fuse assembly with the fuse assembly removed and showing operation of the shutter and status indicator.
Figure 8:
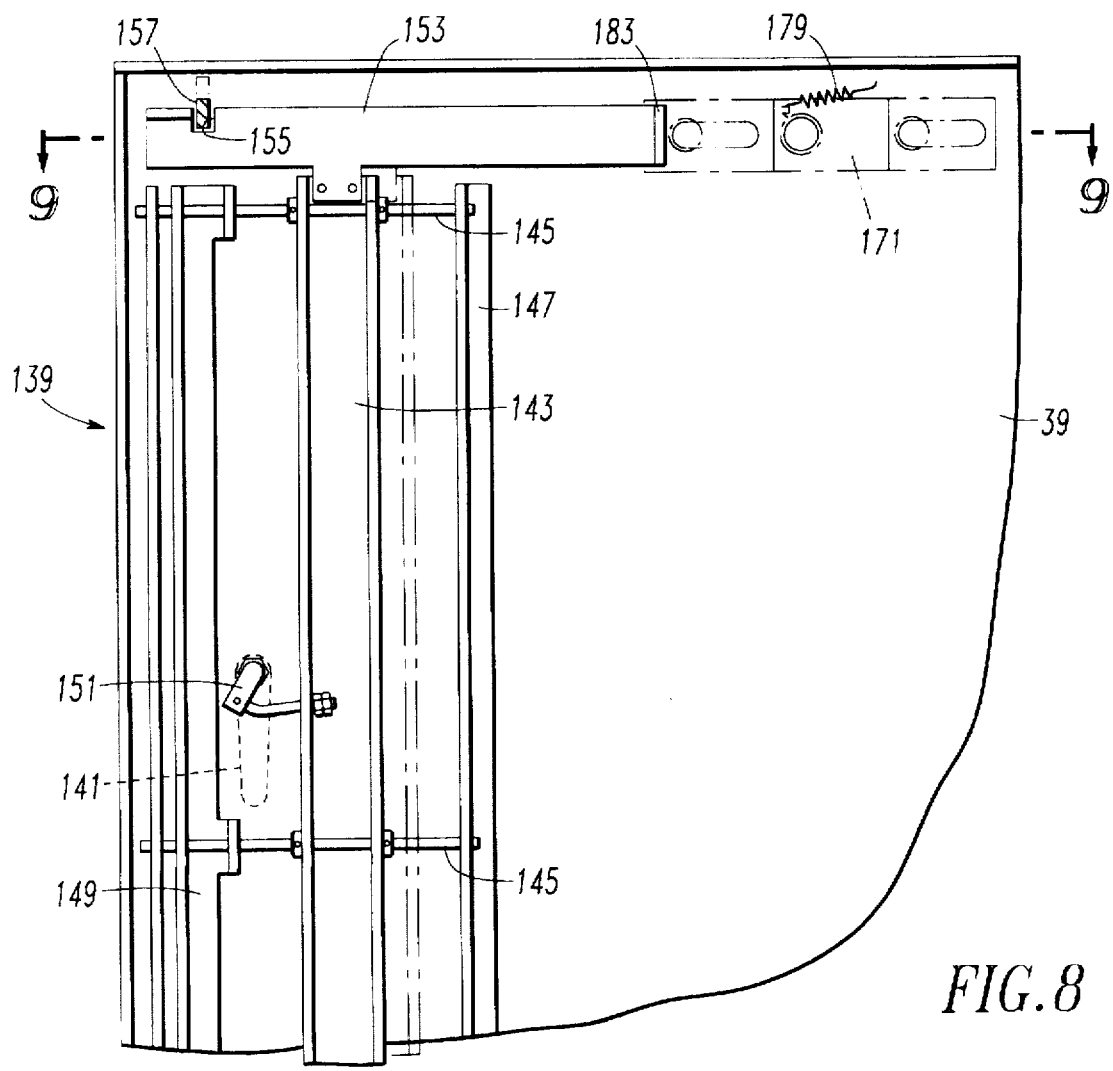
FIG. 8 is a fragmentary elevation view of the inside of the door of the compartment within the switchgear showing the interlock arrangement.

As the carriage 29 is cranked toward the connected position, a cam member 123 mounted on the side of the carriage 29 engages a linkage 124 which opens the shutter 37 permitting the finger cluster 95 to engage the stab 25 (see FIG. 7). This linkage 124 includes a bell crank 125 mounted on a pivot 127. Rotation of the bell crank 125 in a clockwise direction as shown in FIG. 8 results in counter clockwise rotation through the link 129 of the shutter arm 131 pivoted by the pin 133. As the carriage advances, the shutter 37 is raised from a closed position shown in solid line in FIG. 7 to the open position shown in dash dot line. Insertion of the carriage 29 also actuates a rotary switch 135 which connects the secondary of the transformer 21 to the trip unit of the circuit breaker (not shown) as is well known.

The forward end of the threaded shaft 73 of the crank assembly 71 is accessible through an opening 136 in the cabinet 3 covered by the door 39. A crank (not shown) is engaged in the end of the threaded shaft 73 to crank the carriage 29 inward and outward.

For safety purposes, access to the fuses is permitted only when the carriage 29 is fully retracted and therefore the fuses are disconnected from the power buses. This limited access is provided by an interlock system 137 which includes the door 39. Obviously, extender rods cannot be released to renew the fuses unless the door 39 is open. The interlock system 137 prevents opening of the door unless the carriage 29 is in the fully retracted position. As will be seen, the interlock system 137 also includes a mechanism which permits cranking the carriage 29 only when the door is closed, so that it is not possible to open the door with the carriage retracted and then crank it into the engaged position with the door open.

Figure 10:
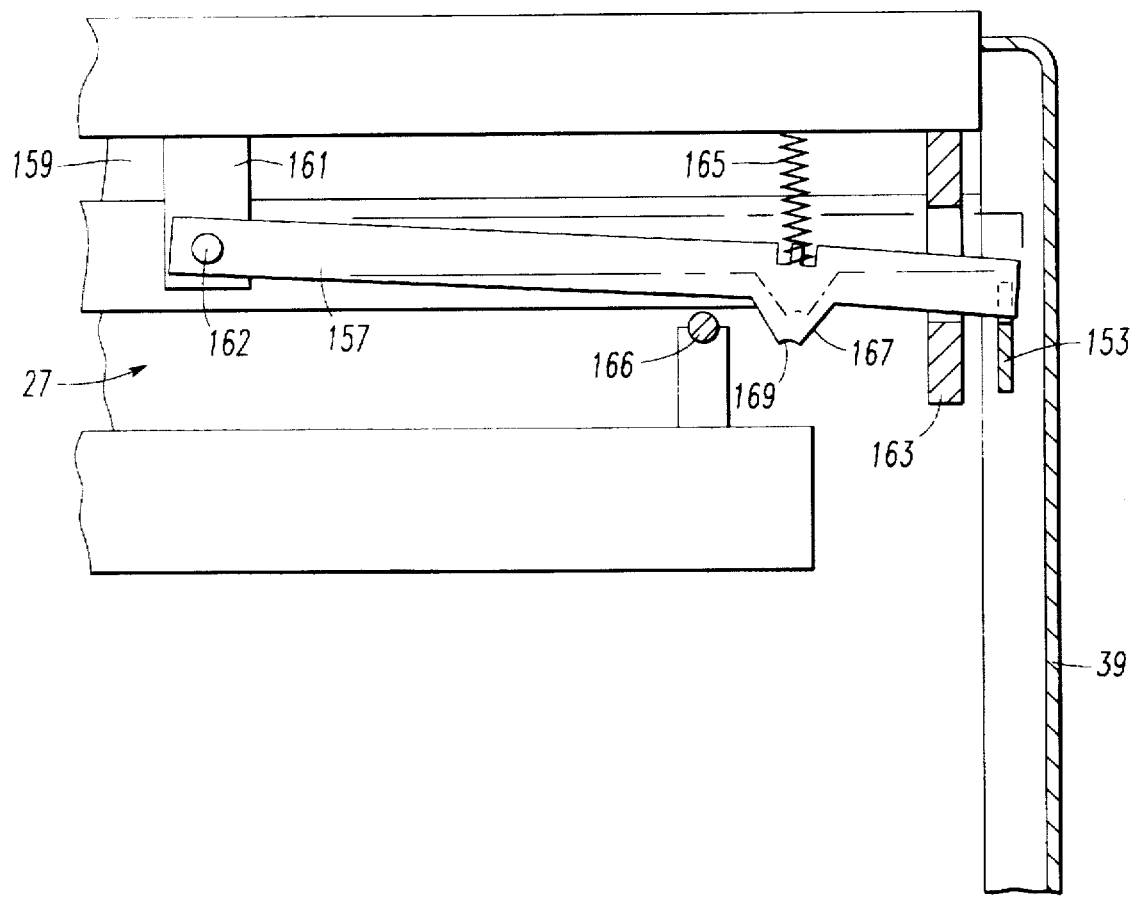
FIG. 10 is a partial elevation view of the right front portion of the side wall of the compartment housing the fuse assembly showing operation of the interlock bar.

The interlock system 137 includes in addition to the door 39, a linkage 139 connected to the door handle 141. This linkage 139 includes a channel 143 mounted for horizontal movement by guide rods 145 supported and spaced apart by angle 147 and channel 149 secured to the inside of the door 39. A bell crank 151 slides the channel 143 horizontally when the handle 141 is turned, and an actuator arm 153 secured to the upper end of the channel 143 moves horizontally with it. The actuator arm 153 has a notch 155 in its upper edge. Referring also to FIG. 10, a locking bar 157 is pivotly mounted at one end adjacent a side wall 159 of the enclosure 27, by bracket 161 and pin 162. The free end of the locking bar 157 extends through the flange 163 on the cabinet 3 forming a jamb for the door 39 and is aligned with the notch 155. A helical compression spring 165 biases the locking bar 157 in a clockwise direction as seen in FIG. 10 to engage the notch 155. With the locking bar engaged in the notch 155, the handle 141 cannot be turned to open the door. However, when the carriage approaches the fully retracted position adjacent the door 39, an extension pin 166 on the carriage roller 65, in the right front corner of the carriage 29 engages a camming surface 167 on the bottom of the locking bar 57 to rotate the bar clockwise to lift it out of the notch 155. A detente 169 in the camming surface 167 retains the locking bar in the retracted position while the carriage is fully retracted. The door can now be opened.

Figure 9:
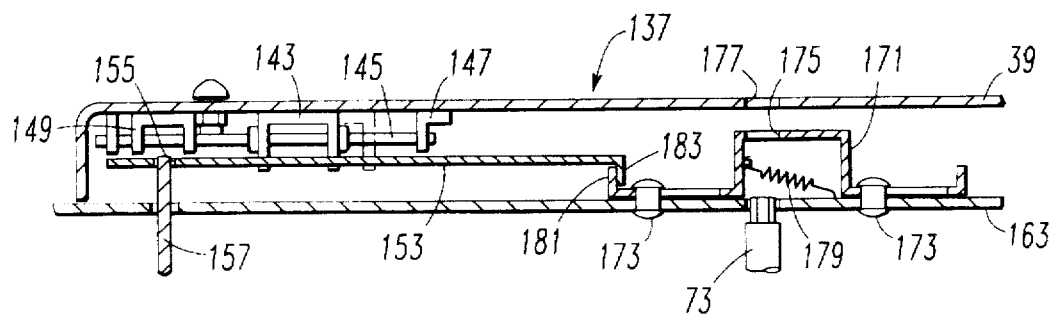
FIG. 9 is a horizontal section taken along the line 9—9 in FIG. 8 and showing the slide arrangement on the door jamb.

Returning to FIGS. 8 and 9, the interlock system 137 also includes a slide 171 mounted for horizontal movement on the door jamb 163 by bolts 173. The slide 171 has an aperture 175 which when aligned with the threaded shaft 73 and the opening 177 in the door 39 permits the crank to be inserted for moving the carriage 29. A helical tension spring 179 biases the slide 171 toward a position where it prevents access to the threaded rod 73. A flange 181 on the slide 171 engages a confronting flange 183 on the end of the actuator arm 153 as the door 139 is closed with the handle still in the unlocked position. When the handle is rotated to secure the door in the closed position, the actuator arm pulls the slide 171 horizontally to align the aperture 175 with the end of the threaded rod 73 and the opening 177 in the door 39 so that the crank can be inserted to reposition the carriage 29. As the aperture 175 comes into alignment with the threaded shaft and opening 177, the notch 155 in the actuator arm 153 comes into alignment with the locking bar 157 so that as the carriage is cranked away from the fully retracted position, the locking bar falls into the notch 155 preventing reopening of the door until the carriage is returned to the fully retracted position.

A status or position indicator 185 provides a positive indication to a user of the condition of the fuse. It includes an indicator bar 187 pivotally mounted on a pivot pin 189 supported by a bracket 191 adjacent the left side of the compartment 27 as shown in FIG. 7. The forward or first end 193 of the indicator bar 187 carries an indicator 195 having an upper red section, an intermediate white section and a bottom green section. A spring 197 biases the interlock bar 187 to an intermediate position in which the white section of the indicator 195 is visible through a window 199. When the carriage 29 in the retraced position (adjacent the door 39), a cam 201 is engaged by an extension pin 203 on the axle for the carriage roller at the left front of the carriage. This lifts the indicator bar so that the green section of the indicator is visible through the window 199. When the carriage 29 is in the connected position (fully inserted), a cam 205 on the other side of the pivot pin 189 rotates the indicator bar counterclockwise in FIG. 7 so that the red section of the indicator 195 is positioned adjacent the window 199 to indicate the corrected status of the fuse assembly.

Figure 11:
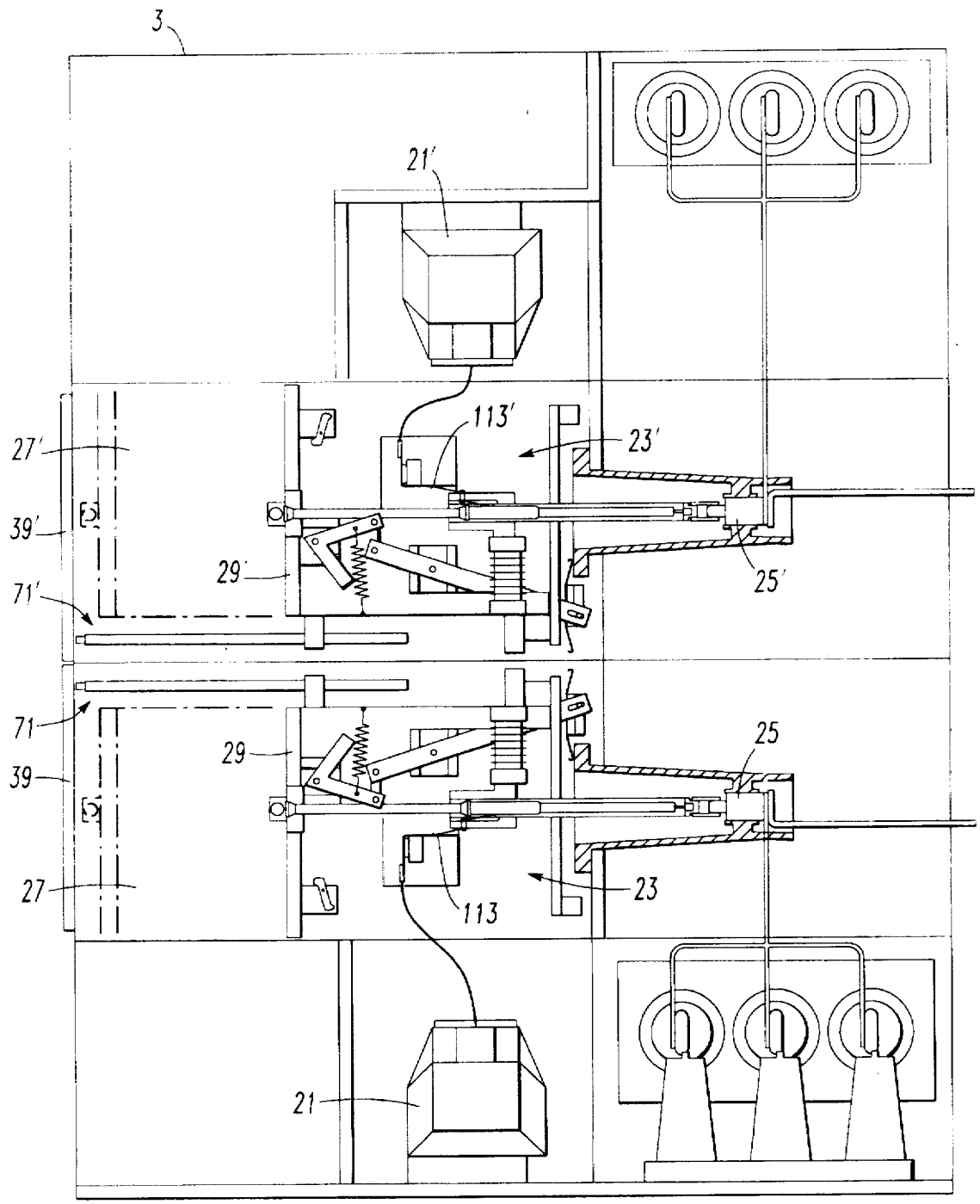
FIG. 11 is a longitudinal, vertical section through another piece of switch gear utilizing two fuse assemblies in accordance with the invention.

The fuse assembly 23 mounted on the carrier 29 in accordance with the invention provides a safe flexible arrangement for fusing transformers in metal clad switch gear. The carrier remains within the cabinet at all times, hence, extension rails are not required to pull the carrier out of the cabinet for changing the fuses. Workers are protected from the high voltage components within the switch gear at all times. The single design is used for local or remote fusing of the transformers. Furthermore, the invention allows novel space saving arrangements for transformers and their fusing. As shown in FIG. 11, the fuse assembly and carriage of the invention can be mounted above a transformer 21, or by turning the carriage and fuse assembly up-side-down, as shown at 29' and 23', can be mounted below a transformer 21' suspended within an enclosure 27'. As indicated in FIG. 11, two transformers 21 and 21' can be mounted one above the other with the respective fuse assemblies 23 and 23' mounted in between so that the crank assemblies 71 and 71' for engaging the fuses with the stabs 25 and 25', respectively are close to each other in height through the doors 39 and 39' for easy access.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. Medium voltage switchgear comprising:
    an enclosure having a back wall, a stab accessible at said back wall and a fixed contact spaced from said back wall;
    a fuse assembly comprising:
        an elongated fuse having a first contact end and a second contact end;
        an insulative tube having a distal end and a proximal end through which said fuse is inserted into said insulative tube;
        first releasable contact means on said distal end of said insulative tube for releasably engaging said stab to electrically connect said first contact end of said fuse to said stab; and
        second releasable contact means mounted on said insulative tube for engaging said second contact end of said fuse; and
    carriage means carrying said fuse assembly and mounted in said enclosure for reciprocal movement between a connected position toward said back wall in which said first releasable contact means of said fuse assembly engages said stab and said second releasable contact means engages said fixed contact, and a retracted position away from said back wall in which said first and second releasable contact means are disengaged from said stab and fixed contact respectively, for insertion of said fuse into and removal from said insulative tube.

2. The medium voltage switchgear of claim 1 wherein said carriage has a front wall with an opening through which said proximal end of said insulative tube is accessible with said carriage means in said retracted position, and means for reciprocating said carriage means between said retracted and connected positions.

3. The medium voltage switchgear of claim 2 wherein said enclosure has a door for access to said fuse assembly and interlock means locking said door closed except when said carriage means is in said retracted position.

4. The medium voltage switchgear of claim 3 wherein said interlock means further comprises means blocking operation of said means for reciprocating said carriage when said door is open.

5. The medium voltage switchgear of claim 1 wherein said enclosure has a plurality of stabs accessible at said back wall and a plurality of fixed contacts spaced from said back wall, and wherein said fuse assembly comprises a plurality of fuses, a plurality of insulative tubes, and first and second releasable contacts associated with each insulative tube which engage associated ones of said stabs and fixed contacts, respectively.

6. The medium voltage switchgear of claim 1 wherein said insulative tube is longer than said elongated fuse and wherein said fuse assembly comprises an insulative extender rod secured to said second contact end of said fuse and extending to said proximal end of said insulative tube.

7. The medium voltage switchgear of claim 6 wherein said first releasable contact means includes a spring biased pin engaging said first contact end of said fuse.

8. The medium voltage switchgear of claim 1 wherein said fuse assembly includes insulative mounts offsetting said insulative tube generally vertically from said carriage means, said carriage means being mountable in said enclosure with said insulative mounts extending generally vertically upward with said insulative tube on top, and alternatively with said insulative mounts extending generally vertically downward with said insulative tube below.

9. The medium voltage switchgear of claim 8 wherein said second releasable contact means of said fuse assembly is on a side of said insulative tube, and wherein with said tube on top, said side faces generally upward for engagement of said releasable contact means with said fixed contact, and with said insulative tube below, said side faces generally downward so that said second releasable contact means engages said fixed contact.

10. The medium voltage switchgear of claim 9 wherein said enclosure has a plurality of stabs accessible at said back wall and a plurality of fixed contacts spaced from said back wall, and wherein said fuse assembly comprises a plurality of fuses, a plurality of insulative tubes, and first and second releasable contact means associated with each insulative tube which engage associated ones of said stabs and fixed contacts, respectively.

11. Medium voltage switchgear comprising:
    an enclosure having a back wall, stab means accessible at said back wall, a door in front of said enclosure and fixed contact means spaced from said back wall;
    transformer means fixedly mounted in said enclosure and connected to said fixed contact means;
    fuse assembly means including a fuse means; and
    means for electrically connecting and disconnecting said fuse between said stab means and said fixed contact means without opening said door and without moving said transformer and for positioning said fuse assembly for removal and replacement of said fuse means through said door while said fuse assembly remains within said enclosure but with said fuse means disconnected from said stab means and fixed contact means.

12. The medium voltage switchgear of claim 11 wherein said fuse assembly means comprises insulative tube means having a distal end and a proximal end through which said fuse means is inserted into said insulative tube means;
    first releasable contact means on said distal end of said insulative tube means for reasonably engaging said stab means to electrically connect a first contact end of said fuse means to said stab means;
    second releasable contact means engaging a second contact end of said fuse means for connecting said fuse means to said fixed contact means and wherein said means connecting and disconnecting said fuse means comprises carriage means carrying said fuse assembly means and mounted in said enclosure for reciprocal movement between a connected position toward said back wall in which said first releasable contact means engages said stab means and said second releasable contact means engages said fixed contact means, and a retracted position toward said door in which said first and second releasable contact means are disengaged from said stab means and said fixed contact means respectively for insertion and removal of said fuse means in and from said insulative tube means through said door.

13. The medium voltage switchgear of claim 12 including interlock means blocking opening of said door except when said carriage means is in said retracted position.

14. The medium voltage switchgear of claim 13 wherein said door includes a door operating mechanism and wherein said interlock means comprises an interlock bar mounted in said enclosure and engaging and blocking operation of said door operating mechanism to prevent opening of said door when said carriage means is not in said retracted position.

15. The medium voltage switchgear of claim 14 wherein said interlock means further includes means pivotally mounting said locking bar, and means biasing said locking bar into engagement with said door operating mechanism, said locking bar being lifted out of engagement with said door operating mechanism by movement of said carriage means to said retracted position.

16. The medium voltage switchgear of claim 15 wherein said carriage means includes a rotable shaft which is engaged for rotation to move said carriage means between said connected and retracted positions, and wherein said interlock means includes means blocking engagement of said rotable shaft and coupled to said door operating mechanism for blocking said rotable shaft when said door is open.

17. The medium voltage switchgear of claim 12 including indicator means indicating the position of said carriage means and comprising an indicator bar mounted on a pivot in said enclosure and having a first end visible at said front of said enclosure means biasing said indicator bar to an intermediate position indicating said carriage means is between said connected and retracted positions, said carriage means having means engaging said indicator bar on a first side of said pivot when said carriage means is in said connected position to position said first end of said indicator bar to indicate the connected position of said carriage means and means engaging said indicator bar on a second side of said pivot when said carriage means is in said retracted position to position said first end of said indicator bar to indicate the retracted position of said carriage means.

18. The medium voltage switchgear of claim 11 wherein said transformer means comprises a first transformer fixedly mounted at a bottom of said enclosure and a second transformer fixedly mounted at a top of said enclosure, said stab means comprising a first stab and a second stab accessible at said back wall intermediate said top and bottom, said fixed contact means comprises a first fixed contact connected to said first transformer and a second fixed contact connected to said second transformer, said fuse assembly means comprises a first fuse assembly associated with said first transformer and including a first fuse, and a second fuse assembly associated with said second transformer including a second fuse, and wherein said means connecting and disconnecting said fuse is between said first and second transformers and comprises first means connecting and disconnecting said first fuse between said first stab in said first fixed contact and positioning said first fuse for removal and replacement through a first door only when said first fuse is disconnected, and second means connecting and disconnecting said second fuse between said second stab and said second fixed contact and positioning said second fuse for removal and replacement through a second door only when second fuse is disconnected.

* * * * *